June 14, 1938.  H. ASSBROICHER ET AL  2,120,881
METHOD OF MAKING MOLDS
Filed Nov. 25, 1936   2 Sheets-Sheet 1
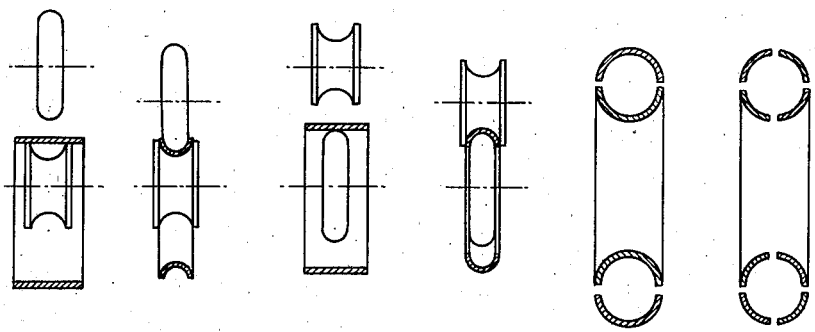
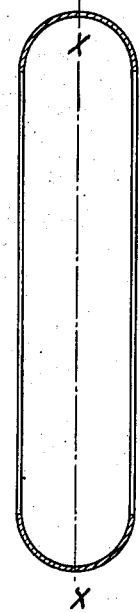
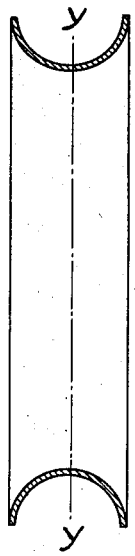
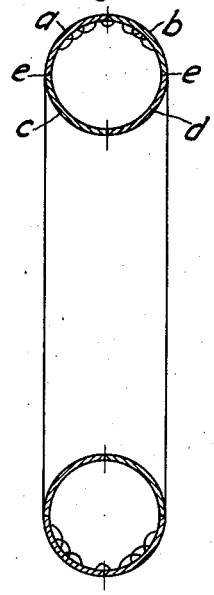
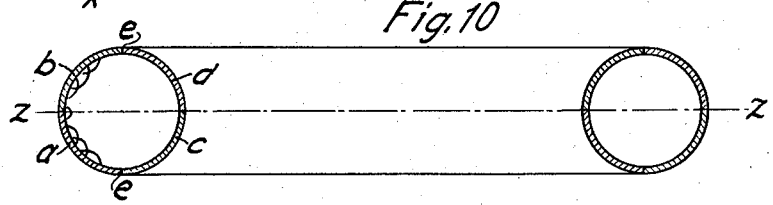
INVENTORS
HEINZ ASSBROICHER
AND KARL HUFF
by their attorneys June 14, 1938.  H. ASSBROICHER ET AL  2,120,881
METHOD OF MAKING MOLDS
Filed Nov. 25, 1936   2 Sheets-Sheet 2

INVENTORS
HEINZ ASSBROICHER
AND KARL HUFF
by their attorneys

Patented June 14, 1938

2,120,881

UNITED STATES PATENT OFFICE 2,120,881

METHOD OF MAKING MOLDS

Heinz Assbroicher, Hanover-Kleefeld, and Karl Huff, Hanover-Herrenhausen, Germany, assignors to Continental Gummi-Werke Aktiengesellschaft, Hanover, Germany Application November 25, 1936, Serial No. 112,800
In Germany November 28, 1935

3 Claims. (Cl. 29—148.2)

Vulcanizing molds of cast steel and cast iron for use in making the tire outer covers and inner tubes and like articles are already known, but as these molds are very liable to fracture, it is necessary for their walls to be made comparatively thick, so as to enable them to withstand the pressures set up in the course of vulcanization. Such molds are, therefore, uneconomical, both as regards cost of material and in actual handling means have to be provided for transporting these heavy molds and, what is more, they require the use of boiler presses or autoclaves; the thick wall of the molds has to be heated up for each vulcanization and, consequently, the complete heating process is rendered both costly and tedious.

It is also known to make hollow annular tire molds from sheet metal, pressed out between a matrix and a die, to correspond to the profile of the tire, such molds consisting of two parts mutually abutting on the lines of greatest and smallest circumference of the hollow ring. The production of these separate parts, from sheet metal is, however, very costly because it requires the use of such powerful (and, therefore, expensive) dies and because such enormous pressures have to be developed by the die presses. For this reason, alone, the use of these pressed sheet metal molds is absolutely precluded in the case of tire manufacturers who are turning out a large number of different types and patterns of tires. In addition to this, the methods of manufacture hitherto used for the production of sheet metal molds have been found to involve difficulties in connection with the formation of the profile or tread pattern matrix in the mold.

These difficulties have only been overcome by further subdividing the two halves of the hollow ring, which expedient, however, necessitates the use of complicated devices for holding the several parts together. This way of making tire molds has not come into extended use because of the need for providing a heavy and costly die outfit in respect of each and every type and size of tire to be produced.

It is an object of the present invention to provide a method of making sheet metal molds which is cheap, owing to the simplicity of the tools required and a further object is to enable the profiles to be produced easily, without being compelled to sacrifice the unity of each half of the mold.

The first of these objects is achieved by shaping up two pieces of tube, by means of calibre rolls, into two rings, having, respectively a semicircular convex and a semicircular concave cross section, the hollows of said cross sections opening in opposed radial directions so that the two semicircular rings, when brought together, form a hollow ring of circular cross section. The advantage of this method is that tire molds of various different diameters can be produced with one pair of rolls, since the size is not dependent on the tools but is determined, in each case, by the development stretching of the material of the ring to be shaped. Each of the two rings thus produced (i. e. the outer and the inner ring), is then cut in two along the line of its greatest and or its smallest circumference, as the case may be.

Finally, the resulting sections are welded together in pairs (each comprising an outer and an inner ring) along the lines of the mean circumference.

The second object is achieved by producing the required profile or tread pattern matrix in the mold previous to the welding step, for instance, before cutting up the outer or convex ring into two rings of quadrantal cross section.

Details of the process and the principles upon which the apparatus employed is based will be apparent on reference to the accompanying drawings, in which Figure 1 shows one piece of tube as it appears prior to being shaped in to a concave ring, as shown in

Figure 2.

Figures 3 and 4 show, respectively, a second piece of tube and its formation into a convex ring.

Figure 5 shows how the concave and convex rings of Figures 2 and 4, being complementary to each other, form together, a hollow ring of circular cross section.

It will be observed that these rings abut along the lines of the mean circumference. Thus in the outer and convex ring the profile or tread pattern can be formed directly, and without hindrance, by embossing or milling.

Figure 6 shows an outer ring so treated, drawn to a larger scale.

Figure 7 shows the inner ring, likewise drawn to a larger scale than the preceding figures.

These two rings are now divided in medial planes indicated by line $x$—$x$ in Figure 6 and by line $y$—$y$ in Figure 7, the actual lines of separation being at the greatest and at the smallest circumference, respectively, so that four rings $a$, $b$, $c$, $d$ of quadrantal cross section, are formed, as indicated in Figure 8 diagrammatically (drawn to the same scale as Figures 1 to 5). The rings a, c on the one hand, and the rings b, d on the other hand, are now united at the lines e corresponding to the mean circumference, as shown in

Figure 9, which like

Figure 10, is drawn to the same scale as Figures 6 and 7. The dotted line z—z in Figure 10 shows the line of division of the finished mold, the halves of which are each in one piece, since the homogeneous union of the material is ensured by welding.

Figure 11:
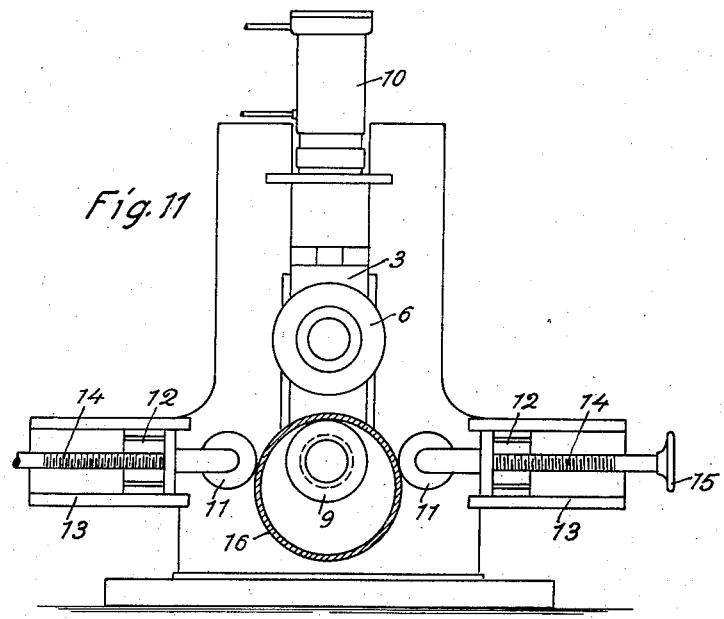
Figure 12:
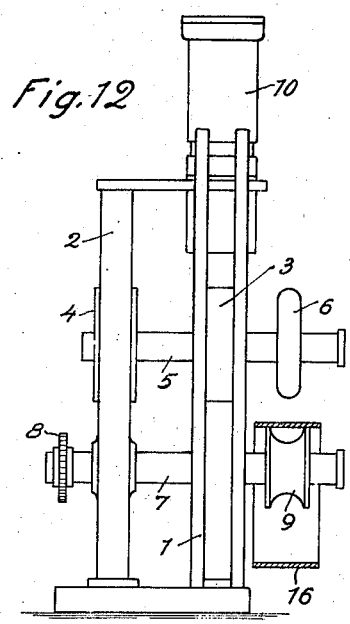

Figures 11 and 12 are front and side elevations, respectively of the calender.

A mold produced in this way is cheap to construct and, in use, it responds perfectly to all practical requirements.

Whereas the weight of the cast molds, hitherto used, amounted say, to about 400 to 450 kilograms, the new mold weighs only about 60 to 75 kilograms, while additional fittings, such as are required with the previously known sheet metal molds and which, again increase the weight, are not necessary.

The calender used for shaping the pieces of tube shown in Figures 1 to 4 is shown in front and side elevation respectively, in Figures 11 and 12.

The two standards 1 and 2 include guideways for slides 3 and 4 in which is mounted the upper shaft 5 carrying, near its free or overhanging end, the convex profiling roll 6. Below the shaft 5, in the standards 1 and 2 is mounted the lower shaft 7, which carries on one end, a driving wheel 8 and, on the other end, below the convex roll 6, a concave profiling roll 9. The slides 3 and 4, together with the upper shaft 5, can be moved up and down in the guideways of the standards by means of a compressed air cylinder 10. Two lateral pressure rolls 11 are mounted in slides 12, moving horizontally in slideways 13 by means of screw-threaded spindles 14 and hand wheels 15.

The annular blank or piece of tube 16, which is to be shaped is hung on the lower profiling roll 9 and the upper shaft, with the upper profiling roll 6 is then forced downwardly towards the said lower roll, so that when the shaft 7 is rotated the annular blank 16 is rotated also and shaped at the same time. A ring with a concaved periphery (corresponding to the periphery of the lower roll 9) results.

If the two profiling rolls be now interchanged the lower roll 9 being shifted to the top shaft 5 and the upper roll 6 to the bottom shaft 7, the press-rolling of an annular blank such as 10 will yield a ring with a convex periphery.

The calibration or profiling of the rolls is such as to compensate for the width of cut when the convex and concave rings are respectively divided.

We claim:

1. A process for the manufacture of thin-walled, hollow annular sheet metal molds, for use in the vulcanization of tires and the like and consisting of two parts abutting along the lines of the greatest and smallest circumferences of the hollow ring, which comprises shaping two pieces of tube by calibre rolls into two rings of semicircular, convex and concave radially opening cross section, which, together, form a hollow ring, then cutting the said convex and concave rings along the lines of the greatest and the smallest circumference, respectively, thereafter pairing the resulting outer and inner rings and then uniting each pair, consisting of an outer and an inner ring, by welding along the line of mean circumference.

2. Process according to claim 1, characterized by forming the tire profile or tread pattern in the outer convex rings, as for instance by an embossing or milling action prior to welding the said outer rings to the inner rings.

3. Process according to claim 1, characterized by forming the tire profile or tread pattern in the outer convex ring, as for instance, by an embossing or milling operation before cutting the said outer ring in two.

HEINZ ASSBROICHER.
KARL HUFF.